US012146029B1

(12) United States Patent
Oster

(10) Patent No.: US 12,146,029 B1
(45) Date of Patent: Nov. 19, 2024

(54) POLYMERS ENHANCED WITH HYDRATED SODIUM SULFOISOPHTHALIC ACID SALTS

(71) Applicant: FutureFuel Chemical Company, Clayton, MO (US)

(72) Inventor: Timothy A. Oster, Batesville, AR (US)

(73) Assignee: FutureFuel Chemical Company, Clayton, MO (US)

( * ) Notice: Subject to any disclaimer, the term of this patent is extended or adjusted under 35 U.S.C. 154(b) by 237 days.

(21) Appl. No.: 17/665,737

(22) Filed: Feb. 7, 2022

Related U.S. Application Data

(60) Provisional application No. 63/146,809, filed on Feb. 8, 2021.

(51) Int. Cl.
  *C08G 69/42*  (2006.01)
  *C08G 63/688* (2006.01)
  *C08G 63/78*  (2006.01)

(52) U.S. Cl.
  CPC ......... *C08G 69/42* (2013.01); *C08G 63/6886* (2013.01); *C08G 63/78* (2013.01)

(58) Field of Classification Search
  CPC ......... C08L 77/06; C08L 77/00; C08G 69/42; C08G 69/36
  See application file for complete search history.

(56) References Cited

U.S. PATENT DOCUMENTS

| | | |
|---|---|---|
| 3,039,990 A | 6/1962 | Huffman |
| 3,142,662 A | 7/1964 | Huffman |
| 3,184,436 A | 5/1965 | Magat |
| 3,296,204 A | 1/1967 | Caldwell |
| 3,542,743 A * | 11/1970 | Flamand ............ C08G 69/42 528/346 |
| 3,567,769 A | 3/1971 | Girard et al. |
| 3,578,640 A | 5/1971 | Twilley et al. |
| 3,640,942 A | 2/1972 | Crampsey |
| 3,689,464 A | 9/1972 | Holub et al. |
| 3,729,446 A | 4/1973 | Holub et al. |
| 3,773,718 A | 11/1973 | Klebe et al. |
| 3,817,934 A | 6/1974 | Hahn et al. |
| 3,846,507 A | 11/1974 | Thomm et al. |
| 3,936,389 A | 2/1976 | King et al. |
| 4,579,762 A | 4/1986 | Ucci |
| 5,108,684 A | 4/1992 | Anton et al. |
| 5,164,261 A | 11/1992 | Windley |
| 5,279,899 A | 1/1994 | Asrar |
| 5,889,138 A | 3/1999 | Summers |
| 6,117,550 A | 9/2000 | Studholme |
| 6,133,382 A | 10/2000 | Studholme |
| 6,433,107 B1 | 8/2002 | Studholme |
| 8,178,648 B2 | 5/2012 | Torno et al. |
| 8,404,886 B2 | 3/2013 | Oster |
| 8,501,898 B2 | 8/2013 | Ortiz et al. |
| 8,772,522 B2 | 7/2014 | Oster |
| 8,809,565 B2 | 8/2014 | Oster |
| 8,884,045 B2 | 11/2014 | Oster et al. |
| 8,933,236 B2 | 1/2015 | Chowdhury et al. |
| 9,193,677 B2 | 11/2015 | Oster |
| 9,212,133 B2 | 12/2015 | Oster |
| 9,359,292 B2 | 6/2016 | Oster et al. |
| RE47,786 E | 12/2019 | Rossignol et al. |
| 10,808,089 B2 | 10/2020 | Fillot et al. |
| 2007/0000065 A1* | 1/2007 | Eroshov ............... D06P 3/8209 8/115.51 |
| 2012/0225981 A1 | 9/2012 | Oster |
| 2013/0053593 A1 | 2/2013 | Oster |
| 2013/0150524 A1 | 6/2013 | Jeol et al. |
| 2014/0272263 A1 | 9/2014 | Keen et al. |
| 2022/0064376 A1 | 3/2022 | Loy et al. |

FOREIGN PATENT DOCUMENTS

| | | |
|---|---|---|
| CN | 112457224 A | 3/2021 |
| FR | 1526954 A | 5/1968 |
| GB | 1208290 A | 10/1970 |
| JP | 48-034840 B | 10/1973 |
| JP | 49-008593 | 1/1974 |
| JP | 54-024956 | 2/1979 |
| JP | 06-173160 | 6/1994 |
| WO | 2014/153251 | 9/2014 |
| WO | 2015/007918 A1 | 1/2015 |
| WO | 2024/018319 A1 | 1/2024 |

OTHER PUBLICATIONS

Hamamoto et al., "Brevisulcenal-F: A Polycyclic Ether Toxin Associated with Massive Fish-kills in New Zealand", Journal of the American Chemical Society, pubs.acs.org/JACS, 2012, 134, pp. 4963-4968.

(Continued)

*Primary Examiner* — Gregory Listvoyb

(74) *Attorney, Agent, or Firm* — Additon, Pendleton & Witherspoon, P.A.

(57) ABSTRACT

Methods for making NaSIPA-enhanced polymers (e.g., polyamide and polyester polymers) using hydrated sodium sulfoisophthalic acid salts (NaSIPA hydrate) are disclosed. NaSIPA-enhanced polymers (e.g., NaSIPA-enhanced polyamides and polyesters) that have NaSIPA incorporated into the polymer chains thereof and products produced from the NaSIPA-enhanced polymers such as carpet yarn are also disclosed.

14 Claims, No Drawings

(56) References Cited

OTHER PUBLICATIONS

Chul Park et al., "Shape memory effect of poly(ethylene terephthalate) and poly(ethylene glycol) copolymer cross-linked with glycerol and sulfoisophthalate group and its application to impact-absorbing composite material," Journal of Applied Polymer Science, vol. 94, pp. 308-316 (2004), Abstract only downloaded from Wiley Online Library at http://onlinelibrary.wiley.com/doi/10.1002/app.20903 on Jan. 30, 2024.

Brydon et al., "Aromatic and heteroatomic polyesters: 1. The 1,3,4-oxadiazole unit as an angular spacer in polyesters based on phenylene and naphthylene groups", Polymer (1989), vol. 30, pp. 619-627.

Brydon et al., "Aromatic and heteroatomic polyesters: 2. The The effect of a range of disrupting units on polyesters based on phenylene and naphthylene groups", Polymer (1993), vol. 34, No. 21, pp. 4481-4487.

UL Prospector, "Viscosity No. ISO 307"; online article (Sep. 2021 ), p. 1-2 (p. 1, para 1-2) URL: https://plastics.ulprospector.com/properties/ISO307.

\* cited by examiner

POLYMERS ENHANCED WITH HYDRATED SODIUM SULFOISOPHTHALIC ACID SALTS

CROSS-REFERENCE TO PRIORITY APPLICATIONS

This application hereby claims the benefit of U.S. Patent Application No. 63/146,809 for Polymers Enhanced with Hydrated Sodium Sulfoisophthalic Acid Salts filed Feb. 8, 2021, which is hereby incorporated by reference in its entirety.

FIELD OF THE INVENTION

The present invention relates methods to improve the processibility of polymers (e.g., polyamides and polyesters) using hydrated sodium sulfoisophthalic acid salts.

BACKGROUND

Polyamide polymers are used in the production of various products, including textile materials. Polyamide fibers, for example, are durable and abrasion resistant and thus are widely used in the production of carpet yarns.

Despite these and other benefits, polyamide carpet yarns can be easily stained by acidic substances such as acid dyes found in soft drinks, food, and wine. Polyamide carpet yarns also can have low affinity for cationic or basic dyes.

One method to improve acid dye stain resistance of polyamide carpet yarns is to topically treat polyamide fibers with a stain resistance agent. Topical stain resistance agents, however, can be removed from the carpet during normal use, maintenance, and cleaning. Topical stain resistance agents also may exhibit inadequate resistance to environmental conditions such as ultraviolet light and can alter the color of the treated carpet fibers.

Another approach for enhancing the resistance of polyamide yarns to acid dye stains is to incorporate compounds including sulfonate moieties into the polyamide polymer. The addition of sulfonated compounds to the polyamide polymer can also improve the affinity of the resultant polyamide textile product for basic dyes. For example, metal salts of sulfoisophthalic acid ("SIPA"), such as anhydrous sodium SIPA salts (also "NaSIPA"), can be added to the polyamide polymerization process to incorporate sulphonate moieties into polyamide polymer chain and impart stain resistance and/or improve basic dye affinity of polyamide textile materials.

The use of anhydrous NaSIPA, however, can be problematic. The use of anhydrous NaSIPA in polyamide production is limited by the generation of buildup (fouling) of polymerization equipment surfaces, including heat exchanger surfaces. This buildup can interfere with heat transfer, thereby lowering efficiency of the manufacturing process. The buildup can also necessitate more frequent cleaning, which also impacts efficiencies and increases costs.

In addition, there have been efforts to increase the amount of sulphonate moieties incorporated into polyamide polymer chains by increasing the amount of anhydrous NaSIPA used in the polyamide polymerization process. Increasing the amount of anhydrous NaSIPA, however, increases the rate of fouling of equipment surfaces. This limits the amount of NaSIPA that can be incorporated into the polyamide polymer chain.

SUMMARY

The present disclosure relates to methods for making NaSIPA-enhanced polymers (e.g., polyamide and polyester polymers) using hydrated sodium sulfoisophthalic acid salts (also referred to herein as hydrated NaSIPA or NaSIPA hydrate).

The present disclosure also relates to NaSIPA-enhanced polymers (e.g., NaSIPA-enhanced polyamides and polyesters) that have NaSIPA incorporated into the polymer chains thereof.

The present disclosure further relates to products produced from the NaSIPA-enhanced polymers such as carpet yarn.

Contrary to conventional methods, the methods of the present disclosure using hydrated NaSIPA can incorporate NaSIPA (sulfur) into polymer chains with unexpectedly reduced or minimal fouling of heat exchanger surfaces. The methods of the present disclosure can also unexpectedly increase the amount of NaSIPA that can be incorporated into a polymer.

Without being bound by any explanation or theory, anhydrous NaSIPA conventionally used in the production of polyamide polymers generates hard, concrete-like particles when re-hydrated or solvated with polyamide monomers. These hard, concrete-like particles are less reactive and some amount pass through the polymerization process without reacting and deposit on hot surfaces of heat exchangers. Use of anhydrous NaSIPA in a masterbatch or directly in the polymer line results in some level of insoluble NaSIPA particles, which are believed to be the source of fouling problems.

In contrast, again without being bound by any explanation or theory, it is currently believed that the use of NaSIPA hydrate will partially or completely eliminate the formation of hard, concrete-like particles of NaSIPA believed to cause fouling problems when making polyamide. Without the fouling, higher levels of NaSIPA can be incorporated in the polyamide polymers, as compared to methods employing anhydrous NaSIPA.

The foregoing illustrative summary, as well as other exemplary objectives, properties, and/or advantages of the disclosure, and the manner in which the same are accomplished, are further explained within the following detailed description.

DETAILED DESCRIPTION

In this detailed description, various aspects and features are herein described to provide a thorough understanding of the present disclosure. It will be apparent, however, to those having ordinary skill in the art that the disclosed methods, polymers, and related products might be achieved without some or all of these specific details. As another example, features disclosed as part of one embodiment can be used in another embodiment to yield a further embodiment. In some instances, well-known aspects have not been described in detail to avoid unnecessarily obscuring the present disclosure. This detailed description is therefore not to be taken in a limiting sense, and it is intended that other embodiments are within the spirit and scope of the present disclosure.

For each range of numerical values specified in this disclosure, all values within the range (including end points) and all subranges within the range are also disclosed. Numerical values provided throughout this disclosure can be approximate. Those of ordinary skill in the art will understand that reasonably different precision and/or accuracy with respect to numerical value(s) may be applicable and suitable for obtaining the desired result and that a numeric value can vary, for example, by plus or minus 10%, plus or minus 5%, plus or minus 1%, plus or minus 0.5%, etc.

NaSIPA-Enhanced Polyamide Polymer

In one aspect, the present disclosure relates to methods for making NaSIPA-enhanced polyamide polymer. The methods of the present disclosure can improve the processibility of NaSIPA-enhanced polyamide polymer, for example, by decreasing the amount of hard, concrete-like particles of NaSIPA formed and by reducing fouling. The methods of the present disclosure also can increase amounts of NaSIPA (sulfur) incorporated into polyamide polymer.

In exemplary embodiments, the method includes polymerizing a polyamide forming reactant in the presence of NaSIPA hydrate to provide a polyamide polymer including NaSIPA incorporated into the structure of the polyamide polymer (e.g., into the polymer backbone).

In some embodiments, the method introduces NaSIPA hydrate and polyamide forming reactant into a suitable reactor before polymerization. For example, the method can include sequentially or concurrently introducing separate feeds of NaSIPA hydrate and polyamide forming reactant into a reactor and thereafter subjecting the NaSIPA hydrate and polyamide forming reactant to polymerization reaction conditions. As another example, the method can include forming a mixture of NaSIPA hydrate and polyamide forming reactant, introducing the NaSIPA hydrate-polyamide forming reactant mixture into a suitable reactor, and subjecting the mixture to polymerization reaction conditions. As yet another example, the method can include forming a masterbatch of NaSIPA hydrate and a suitable carrier, sequentially or concurrently introducing the masterbatch and polyamide forming reactant into a suitable reactor, and subjecting the masterbatch and polyamide forming reactant to polymerization reaction conditions.

In some embodiments, the method introduces NaSIPA hydrate into a suitable reactor during polymerization. For example, the method can include introducing polyamide forming reactant into a reactor, subjecting the polyamide forming reactant to polymerization reaction conditions to initiate polymerization, and introducing NaSIPA hydrate into the reactor after polymerization begins (e.g., introducing NaSIPA hydrate during polymerization of the polyamide forming reactant). NaSIPA hydrate can be introduced once during polymerization or more than once at different polymerization stages. NaSIPA hydrate also can be introduced singly, as a mixture with additional polyamide forming reactant and/or as a masterbatch of NaSIPA hydrate and a suitable carrier.

In other exemplary embodiments, the method includes providing a polyamide polymer; and introducing NaSIPA hydrate into the polyamide polymer. For example, a polyamide polymer can be provided by reacting a polyamide forming reactant to form a polyamide precursor; and polymerizing the polyamide precursor to form a polyamide polymer. The polyamide forming reactant can be reacted in the presence of NaSIPA hydrate to achieve NaSIPA-enhanced polyamide precursor; and/or the polyamide precursor can be polymerized in the presence of NaSIPA hydrate to achieve NaSIPA-enhanced polyamide polymer; and/or NaSIPA hydrate can be introduced to the polyamide polymer after polymerization achieve NaSIPA-enhanced polyamide polymer. The NaSIPA hydrate can be introduced singly, as a mixture with additional polyamide forming reactant and/or as a masterbatch of NaSIPA hydrate and a suitable carrier.

Other exemplary embodiments include a method for reducing fouling of a surface of a polymerization reactor system during production of NaSIPA-enhanced polymers, e.g., NaSIPA-enhanced polyamide polymers. The method includes polymerizing polymer forming reactant, e.g., polyamide forming reactant, in a polymerization reactor system in the presence of NaSIPA hydrate to form NaSIPA-enhanced polymer, e.g., NaSIPA-enhanced polyamide polymer. The polymerizing step can include introducing the NaSIPA hydrate into the polymerization reactor system before and/or during and/or after the polymerizing step, for example as discussed in more detail herein.

As discussed herein, and again without being bound by any theory or explanation, it is currently believed that anhydrous NaSIPA generates hard, concrete-like particles when re-hydrated or solvated with polyamide monomers. The concrete-like particles can pass through the polymerization process without reacting and can cause fouling of surfaces of the polymerization reactor system, for example, by depositing on hot surfaces of heat exchangers.

In contrast, again without being bound by any explanation or theory, it is currently believed that that use of NaSIPA hydrate can partially or completely eliminate the formation of hard, concrete-like particles of NaSIPA believed to cause fouling problems. Thus, the use of NaSIPA hydrate may reduce fouling of a surface of the polymerization reactor system from insoluble NaSIPA-based compounds, such as the hard, concrete-like particles that can form when using anhydrous NaSIPA. The method accordingly can reduce fouling of a surface of the polymerization reactor system as compared to a method using anhydrous NaSIPA.

In exemplary embodiments, the polymerization reactor system includes a polymerization reactor and a heat exchanger. Polymerization reactor systems for the production of polyamide polymers, including polymerization reactors and heat exchangers associated with the same, are well known in the art and the use and structure thereof is well understood by the skilled artisan. The polymerizing step can be conducted in the polymerization reactor, and the method can further include the step of directing the NaSIPA-enhanced polymer, e.g., NaSIPA-enhanced polyamide polymer, from the polymerization reactor to the heat exchanger, wherein fouling of a surface of the heat exchanger is reduced.

The carrier of the masterbatch can be any suitable material and is typically a material compatible with the polyamide formed in the method. For example, the carrier can include one or more polyamides, such as a polyamide that is the same as the polyamide produced according to the method. The carrier can alternatively or in addition include a polyamide forming reactant and/or one or more other suitable polymer carriers.

The masterbatch includes a ratio of NaSIPA hydrate to carrier selected to provide the desired amount of NaSIPA hydrate in the method. For example, the masterbatch can include NaSIPA hydrate in an amount of 1 to 50 parts by weight, for example 1 to 25 parts by weight, and as another example 1 to 10 parts by weight, per 100 parts by weight carrier. In other embodiments, the masterbatch can include similar or larger amounts of NaSIPA hydrate relative to the amount of carrier.

The skilled artisan will understand how to formulate a masterbatch using techniques and materials known in the art and further will understand specific conditions associated with formulating a masterbatch, including amounts and types of the NaSIPA hydrate and carrier. The skilled artisan will also recognize that the foregoing is provided to aid in the understanding of the disclosure and should not be interpreted as limiting the scope thereof.

NaSIPA hydrates can be prepared using methods known in the art. An exemplary method includes providing a solution containing sulfoisophthalic acid (HSIPA). A solution including HSIPA can be prepared by sulfonating isophthalic acid, for example, by combining isophthalic acid with oleum ("fuming sulfuric acid") or pure $SO_3$.

The solution containing HSIPA can be contacted with a sodium cation producing compound, such as but not limited to NaOH, to form a reaction mixture. There are various options known in the art for contacting the HSIPA with the sodium cation producing compound, including, for example, combining a solution of HSIPA with an aqueous solution containing a sodium cation-producing compound to form a reaction mixture.

The reaction mixture can then be maintained under conditions (e.g., temperature and time) sufficient to form a sodium salt of HSIPA (NaSIPA). The NaSIPA can then be isolated (e.g., filtered) from the reaction mixture and optionally washed, for example with acetic acid.

Those skilled in the art recognize that the steps outlined above for making NaSIPA can vary and that the foregoing exemplary embodiment is provided to aid in the understanding of the disclosure and should not be interpreted as limiting the scope thereof. The skilled artisan also understands specific conditions associated with the production of NaSIPA, such as amounts and types of reagents, temperatures, reaction times, and the like. Exemplary methods for making NaSIPA can be found, for example, in commonly assigned U.S. Pat. No. 8,772,522 and commonly assigned U.S. Pat. No. 8,809,565, the entire disclosure of each of which is incorporated herein by reference.

Conventionally, anhydrous NaSIPA is used in polymer production. In contrast, in the current disclosure, NaSIPA is provided in the form of a hydrate, such as represented by the formula NaSIPA·$xH_2O$, wherein x represents the number of water molecules. In exemplary embodiments, the NaSIPA hydrate is NaSIPA monohydrate (x=1).

In exemplary embodiments, the NaSIPA hydrate is a hydrate of the sodium salt of 5-sulfoisophthalic acid of the formula below:

For example, the NaSIPA hydrate can be a monohydrate of the sodium salt of 5-sulfoisophthalic acid, wherein x in the formula above is 1.

The skilled artisan will understand conditions such as drying temperatures, drying duration, etc. to use to make NaSIPA hydrates, such as NaSIPA monohydrate. As a non-limiting example, NaSIPA produced as described herein can be dried at a temperature of 20° C. to 100° C. for a period for 30 minutes to 24 hours to provide NaSIPA monohydrate. The skilled artisan will understand and appreciate that drying conditions such as temperature and duration can vary depending on various factors, including but not limited to the type and/or amount of solvent(s) present in the NaSIPA material.

The amount of NaSIPA hydrate used in the method can vary, for example depending on the amount of NaSIPA to be incorporated into the polymer. In exemplary embodiments, the method can include polymerizing the polyamide forming reactant in the presence of at least 1 weight percent NaSIPA hydrate, based on the total weight (100 weight percent) of NaSIPA hydrate and polyamide forming reactant. In other exemplary embodiments, the method can include polymerizing the polyamide forming reactant in the presence of at least 2 weight percent NaSIPA hydrate, based on the total weight (100 weight percent) of NaSIPA hydrate and polyamide forming reactant. As another example, the method can include polymerizing the polyamide forming reactant in the presence of 1 weight percent to 4.9 weight percent NaSIPA hydrate, for example 2 weight percent to 4.9 weight percent NaSIPA hydrate, as another example at least 4.9 weight percent NaSIPA hydrate, as another example 4.9 weight percent to 9 weight percent NaSIPA hydrate, and as another example at least 9 weight percent NaSIPA hydrate, based on the total weight (100 weight percent) of NaSIPA hydrate and polyamide forming reactant. As another example, the method can include polymerizing the polyamide forming reactant in the presence of 1 weight percent to 10 weight percent, for example 5 weight percent to 9 weight percent, NaSIPA hydrate, based on the total weight (100 weight percent) of NaSIPA hydrate and polyamide forming reactant. In some embodiments, the method can include polymerizing the polyamide forming reactant in the presence of at least 1, 2, 3, 4, 5, 6, 7, 8, 9, 10, or higher, weight percent NaSIPA hydrate, based on the total weight (100 weight percent) of NaSIPA hydrate and polyamide forming reactant. Further, according to some embodiments, NaSIPA hydrate can be present in an amount from any of the foregoing amounts to any other of the foregoing amounts.

The method incorporates NaSIPA, and thus sulfur, derived from NaSIPA hydrate into the polymer, e.g., polyamide, structure. By way of example, polymerizing polyamide forming reactants in the presence of 1 weight percent NaSIPA hydrate can introduce approximately 1100 ppm sulfur into the polyamide polymer structure. For comparison, methods using 1 weight percent anhydrous NaSIPA can introduce approximately 1200 ppm sulfur into the polyamide polymer structure. As discussed herein, however, the methods of the present disclosure can in some embodiments incorporate higher amounts of NaSIPA, and thus higher amounts of sulfur, into the polyamide polymer structure, relative to the amount of NaSIPA, and sulfur, that can be introduced into the polyamide polymer using anhydrous NaSIPA. In exemplary embodiments, the method can introduce NaSIPA hydrate in an amount sufficient to incorporate at least 1000 ppm sulfur, for example at least 2500 ppm sulfur, derived from the NaSIPA hydrate into the polyamide polymer structure. For example, the method can introduce NaSIPA hydrate in an amount sufficient to incorporate 1000 ppm sulfur to 5500 ppm sulfur, as another example 2500 ppm sulfur to 5500 ppm sulfur, as another example at least 5500 ppm sulfur, as another example 5500 ppm to 10,000 ppm sulfur, and as another example at least 10,000 ppm sulfur derived from NaSIPA hydrate into polyamide polymer. As another example, the method can introduce NaSIPA hydrate in an amount sufficient to incorporate 1000 ppm to 10,000 ppm, for example 2500 ppm to 10,000 ppm, sulfur derived from the NaSIPA hydrate into the polyamide polymer structure. In some embodiments, the method can introduce NaSIPA hydrate in an amount sufficient to incorporate at least 1000, 1500, 2000, 2500, 3000, 3500, 4000, 4500, 5000, 5500, 6000, 6500, 7000, 7500, 8000, 8500, 9000, 9500, 10,000, or higher, ppm sulfur derived from the NaSIPA hydrate into the polyamide polymer structure. Further, according to some embodiments, the method can introduce sulfur into the polyamide polymer structure in an amount from any of the foregoing amounts to any other of the foregoing amounts.

The NaSIPA-enhanced polyamide polymers can be formed using one or more polyamide forming reactants. Examples of the polyamide forming reactant can include without limitation a dicarboxylic acid component, a diamine component, a dicarboxylic acid component-diamine component salt, a lactam, and/or an amino acid and/or amide forming derivative thereof.

Examples of the dicarboxylic acid component include without limitation aliphatic, aromatic, and/or alicyclic dicarboxylic acids and/or amide forming derivatives thereof.

Examples of aliphatic dicarboxylic acids include without limitation malonic acid, dimethyl malonic acid, succinic acid, glutaric acid, adipic acid, pimelic acid, azelaic acid, oxalic acid, sebacic acid, suberic acid, octadecanedioic acid, undecanedioic acid, and/or tetradecanedioic acid.

Examples of aromatic dicarboxylic acids include without limitation terephthalic acid, isophthalic acid, 2,6-naphthalenedicarboxylic acid, 2,7-naphthalenedicarboxylic acid, 1,4-naphthalenedicarboxylic acid, 1,4-phenylenedioxyphenylene acid, 1,3-phenylenedioxydiacetic acid, diphenic acid, 4,4'-oxybis(benzoic acid), diphenylmethane-4,4'-dicarboxylic acid, diphenylsulfone-4,4'-dicarboxylic acid, and/or 4,4'-biphenyldicarboxylic acid.

Examples of alicyclic dicarboxylic acids include without limitation 1,3-cyclopentane dicarboxylic acid and/or 1,4-cyclohexane dicarboxylic acid.

Examples of the diamine component include without limitation aliphatic, alicyclic, and/or aromatic diamines and/or amide forming derivatives thereof.

Examples of the aliphatic diamines include without limitation 1,6-hexanediamine, 1,7-heptanediamine, 1,8-octanediamine, 1,9-nonanediamine, 1,10-decanediamine, 1,11-undecanediamine, 1,12-dodecanediamine, 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-diethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, and/or 5-methyl-1,9-nonanediamine.

Examples of the alicyclic diamines include without limitation 3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, and/or bis(aminopropyl)piperazine, aminoethylpiperazine.

Examples of the aromatic diamines include without limitation m-xylylenediamine and/or p-xylylenediamine.

Examples of the lactam include without limitation ε-caprolactam and/or ω-laurolactam.

Examples of the amino acid and/or an amide forming derivatives thereof include without limitation 6-aminocaproic acid, 9-aminononanoic acid, 11-aminoundecanoic acid, 12-aminododecanoic acid, 17-aminoheptadecanoic acid, and/or p-aminomethyl benzoic acid.

Polyamide homopolymers and/or copolymers derived from these materials may be used alone or as a mixture thereof.

Examples of the polyamide polymers may include without limitation one or more of polyamide 6, polyamide 66, polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, polyamide 66/12/6I, and/or copolymers and/or mixtures thereof.

For example, the polyamide polymer can include without limitation PA6, PA66, copolymers of PA6 and PA66, and/or mixtures thereof.

The polyamide polymer is not limited to the foregoing and can generally be any polyamide known in the art.

Methods for making polyamide polymer are well known in the art and the specific parameters and conditions thereof (for example, reactant amounts, temperature, pressure, duration, etc.) will be understood by the skilled artisan. The polymerization reaction is typically conducted under conditions to form NaSIPA-enhanced polyamide polymer suitable for the production of polyamide fiber.

For example, the polyamide forming reactant can be heated at a temperature of 180° C. to 400° C., for example 200° C. to 300° C., and as another example 230° C. to 290° C., for 4 to 24 hours, to cause the polyamide forming reactant to polymerize and form a polyamide polymer. Generally, the polyamide polymer is polymerized until the polymer has a molecular weight sufficient to exhibit fiber forming properties.

The skilled artisan will understand the properties associated with polyamide polymer suitable for fiber formation. As a non-limiting example, fiber forming polyamide polymer can have a relative viscosity of 1.8 dl/g or more, for example 2 dl/g to 4 dl/g. NaSIPA-enhanced polyamide polymer with a relative viscosity within these ranges can generally have sufficient properties such as mechanical strength and/or heat resistance suitable for fiber formation. As used herein with respect to polyamide polymer, relative viscosity is a value that can be measured as known in the art, for example, at 25° C. after adding 1 weight percent of the polyamide resin to m-cresol.

The skilled artisan will recognize that the foregoing is provided to aid in the understanding of the disclosure and should not be interpreted as limiting the scope thereof.

Upon completion of the polymerization reaction, the resultant NaSIPA-enhanced polyamide polymer can be removed from the reactor and formed into chips, pellets, flakes and the like for storage and later use.

The method of the present disclosure can include additional downstream processing steps. For example, in exemplary embodiments, the method can include forming (e.g., melt spinning) the NaSIPA-enhanced polyamide polymer into fibers. The method can further include forming the NaSIPA-enhanced polyamide polymer fibers into a textile product, such as carpet yarn. Methods for polyamide fiber formation as well as for the production of other textile structures are well known in the art and the skilled artisan will understand conditions for the same.

In another aspect, the present disclosure relates to NaSIPA-enhanced polymers (e.g., NaSIPA-enhanced polyamides and polyesters) that have NaSIPA incorporated into the polymer structure (e.g., into the polymer backbone, as pendant groups and/or as terminal groups) produced using the methods described herein using NaSIPA hydrate (e.g., have NaSIPA derived from NaSIPA hydrate incorporated into the polymer structure). In exemplary embodiments, the NaSIPA-enhanced polyamides can include at least 1 weight percent NaSIPA derived from NaSIPA hydrate incorporated into the polymer. In other exemplary embodiments, the NaSIPA-enhanced polyamides can include at least 2 weight percent NaSIPA derived from NaSIPA hydrate incorporated into the polymer. In other exemplary embodiments, the NaSIPA-enhanced polyamides can include greater than 2 weight percent NaSIPA derived from NaSIPA hydrate incorporated into the polymer. In other exemplary embodiments, the NaSIPA-enhanced polyamides can include at least 3 weight percent NaSIPA derived from NaSIPA hydrate incorporated into the polymer. For example, the NaSIPA-enhanced polyamides can include 1 weight percent to 4.9 weight percent NaSIPA, for example 2 weight percent to 4.9 weight percent NaSIPA, as another example at least 4.9 weight percent NaSIPA, as another example 4.9 weight percent to 8.9 weight percent NaSIPA, and as another example at least 8.9 weight percent NaSIPA derived from NaSIPA hydrate incorporated into polyamide polymer. As another example, the NaSIPA-enhanced polyamide can include 1 weight percent to 10 weight percent, for example 3 weight percent to 9 weight percent, NaSIPA derived from NaSIPA hydrate incorporated into the polyamide polymer. In some embodiments, the NaSIPA-enhanced polyamide can include at least 1, 2, 3, 4, 5, 6, 7, 8, 9, 10, or higher, weight percent NaSIPA derived from NaSIPA hydrate incorporated into the polyamide polymer. Further, according to some embodiments, the NaSIPA-enhanced polyamide can include NaSIPA derived from NaSIPA hydrate incorporated into the polyamide polymer in an amount from any of the foregoing amounts to any other of the foregoing amounts.

In exemplary embodiments, the NaSIPA-enhanced polyamides can include at least 1000 ppm sulfur, for example at least 2500 ppm sulfur, derived from NaSIPA hydrate incorporated into the polymer structure. For example, the NaSIPA-enhanced polyamides can include 1000 ppm sulfur to 5500 ppm sulfur, for example 2500 ppm sulfur to 5500 ppm sulfur, as another example at least 5500 ppm sulfur, as another example 5500 ppm to 10,000 ppm sulfur, and as another example at least 10,000 ppm sulfur derived from NaSIPA hydrate incorporated into polyamide polymer. As another example, the NaSIPA-enhanced polyamide can include 1000 ppm to 10,000 ppm, for example 2500 ppm to 10,000 ppm, sulfur derived from NaSIPA hydrate incorporated into the polyamide polymer. In some embodiments, the NaSIPA-enhanced polyamide can include at least 1000, 1500, 2000, 2500, 3000, 3500, 4000, 4500, 5000, 5500, 6000, 6500, 7000, 7500, 8000, 8500, 9000, 9500, 10,000, or higher, ppm sulfur derived from NaSIPA hydrate incorporated into the polyamide polymer. Further, according to some embodiments, the NaSIPA-enhanced polyamide can include NaSIPA derived from NaSIPA hydrate incorporated into the polyamide polymer in an amount from any of the foregoing amounts to any other of the foregoing amounts.

In another aspect, the present disclosure relates to products produced from the NaSIPA-enhanced polymers described herein (e.g., NaSIPA-enhanced polyamides and polyesters), including fibrous materials. The term "fibrous materials" can include without limitation fibers, yarns, non-woven fabrics, woven fabrics, and/or knit fabrics. The term "fiber" can refer to fibers of finite length, such as conventional staple fiber, and also to substantially continuous filaments. The term "fiber" also includes spunbonded filaments, meltblown fibers, fibers produced by electrospinning, nanofibers, nanofilaments, and the like, as known the art. NaSIPA-enhanced polyamide fibers can be spun, knitted, woven, pressed, tufted or otherwise formed to provide textile products or articles such as but not limited to yarns (including carpet yarns), threads, fabrics (knit, woven, non-woven), carpets, rugs, and the like.

NaSIPA-Enhanced Polyester Polymer

In another aspect, the present disclosure relates to methods for making NaSIPA-enhanced polyester polymer.

Those having ordinary skill in the art will know that there are two primary methods for making polyester polymer, namely, ester interchange and direct esterification. The two methods react a dicarboxylic acid component and a diol component (i.e., a dicarboxylic acid moiety and a diol moiety) to form polyester prepolymers, and then polymerize the prepolymers via melt phase polycondensation to form polyester polymers.

As used herein, the terms dicarboxylic acid component and dicarboxylic acid moiety can refer to a dicarboxylic acid and/or a dialkyl ester (dicarboxylate) and/or anhydride thereof, unless otherwise defined. The dicarboxylic acid component accordingly can include one or more dicarboxylic acids and/or dialkyl esters (or dicarboxylates) and/or anhydrides thereof. The dicarboxylic acid can be an aromatic and/or aliphatic (e.g., linear, branched and/or cyclic aliphatic) dicarboxylic acid and/or dialkyl ester and/or anhydride thereof.

Examples of aromatic dicarboxylic acids include without limitation terephthalic acid, isophthalic acid, phthalic acid, biphenyl dicarboxylic acid, anthracene dicarboxylic acid, 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalene dicarboxylic acid, and the like, and mixtures thereof.

Examples of aromatic dicarboxylates and/or anhydrides include without limitation dimethyl terephthalate (DMT), dimethyl isophthalate, dimethyl-1,2-naphthalate, dimethyl-1,5-naphthalate, dimethyl-1,6-naphthalate, dimethyl-1,7-naphthalate, dimethyl-1,8-naphthalate, dimethyl-2,3-naphthalate, dimethyl-2,6-naphthalate, dimethyl-2,7-naphthalate, phthalic anhydride, and the like, and mixtures thereof.

Examples of aliphatic dicarboxylic acids and/or dialkyl esters and/or anhydrides thereof include without limitation adipic acid, dimethyl adipate, succinic acid, dimethyl succinate, succinic anhydride, glutaric acid, azelaic acid, sebacic acid, suberic acid, brassylic acid, cyclohexane dicarboxylic acid, adamantane 1,3-dicarboxylic acid, and the like, and mixtures thereof.

The diol component can include one or more of an aliphatic (e.g., linear, branched and/or cyclic aliphatic) and/or aromatic diol. Examples of the aliphatic diol can include without limitation ethylene glycol, 1,3-propane diol, 1,4-butane diol, 1,5-pentane diol, 1,6-hexane diol, 3-methylpentane-2,4-diol, 2-methylpentane-1,4-diol, 2,2,4-trimethylpentane-1,3-diol, 2-ethylhexane-1,3-diol, 2,2-diethylpropane-1,3-diol, 1,4-cyclohexane dimethanol (CHDM), diethylene glycol, propylene glycol, neopentyl glycol, 2-methyl-1,3-propanediol, 2,2,4,4-tetramethyl-1,3-cyclobutanediol, adamantane-1,3-diol, 3,9-bis(1,1-dimethyl-2-hydroxyethyl)-2,4,8,10-tetraoxaspiro[5.5]undecane, and the like, and mixtures thereof.

Examples of the aromatic diol can include without limitation 2,2-bis-(3-hydroxyethoxyphenyl)-propane, 2,2-bis-(4-hydroxypropoxyphenyl)-propane and the like, and mixtures thereof.

Examples of the polyester polymer can include without limitation polyethylene terephthalate (PET), polybutylene terephthalate (PBT), polyethylene naphthalate (PEN), polytrimethylene terephthalate (PTT), and/or polycyclohexylene terephthalate (PCT), and the like, and mixtures thereof. The polyester polymer is not limited to the foregoing and can generally be any polyester known in the art.

In exemplary embodiments, the method for making NaSIPA-enhanced polyester polymer includes reacting a dicarboxylic acid component and a diol component to form polyester precursors; introducing NaSIPA hydrate to the dicarboxylic acid component, the diol component, and/or the polyester precursors before the polyester precursors achieve an average degree of polymerization of 10 or more; and polymerizing the polyester precursors via melt phase polycondensation to form a melt comprising polyester polymers.

In this embodiment, the step of introducing NaSIPA hydrate can include introducing NaSIPA hydrate to the dicarboxylic acid component and/or the diol component before initiation of the reacting step. For example, the method can include sequentially or concurrently introducing separate feeds of NaSIPA hydrate, dicarboxylic acid component, and diol component into a suitable reactor before initiation of the reacting step. As another example, the method can include forming a mixture of NaSIPA hydrate and dicarboxylic acid component and/or diol component and introducing the mixture into a suitable reactor before initiation of the reacting step. As yet another example, the method can include forming a masterbatch of NaSIPA hydrate and a suitable carrier and sequentially or concurrently introducing the masterbatch, the dicarboxylic acid component, and the diol component into a suitable reactor before initiation of the reacting step.

Alternatively, or in addition, the step of introducing NaSIPA hydrate can include introducing NaSIPA hydrate to the dicarboxylic acid component, the diol component, and/or the polyester precursors after initiation of the reacting step. NaSIPA hydrate can be introduced once during polymerization or more than once at different polymerization stages. In this embodiment, NaSIPA hydrate also can be introduced singly, as a mixture with additional dicarboxylic acid component and/diol component, and/or as a masterbatch of NaSIPA hydrate and a suitable carrier.

In other exemplary embodiments, the method for making NaSIPA-enhanced polyester polymer includes providing polyester polymers; and introducing NaSIPA hydrate into the polyester polymers. The step of providing polyester polymers can include reacting a dicarboxylic acid component and a diol component to form polyester precursors; and polymerizing the polyester precursors via melt phase polycondensation to form polyester polymers.

In this embodiment, the step of polymerizing the polyester precursors can include polymerizing the polyester precursors via melt phase polycondensation in the presence of NaSIPA hydrate to achieve NaSIPA-enhanced polyester polymers. For example, the step of polymerizing the polyester precursors can include polymerizing the polyester precursors via melt phase polycondensation to achieve a polyester polymer melt having an intrinsic viscosity of at least about 0.45 dL/g; introducing NaSIPA hydrate into the polyester polymer melt; and thereafter completing the melt phase polycondensation of the polyester polymer melt. Again, NaSIPA hydrate can be introduced singly, as a mixture with additional dicarboxylic acid component and/or diol component, and/or as a masterbatch of NaSIPA hydrate and a suitable carrier.

In other examples of this embodiment, NaSIPA hydrate can be introduced into the polyester polymers after melt phase polycondensation, for example, before and/or during solid state polymerization.

Other exemplary embodiments include a method for reducing fouling of a surface of a polymerization reactor system during production of NaSIPA-enhanced polymers, e.g., polyester polymers. The method includes polymerizing polymer forming reactant, e.g., polyester forming reactant, in a polymerization reactor system in the presence of NaSIPA hydrate to form NaSIPA-enhanced polymer, e.g., NaSIPA-enhanced polyester polymer. The polymerizing step can include introducing the NaSIPA hydrate into the polymerization reactor system before and/or during the polymerizing step, for example as discussed in more detail herein.

The use of NaSIPA hydrate may reduce fouling of a surface of the polymerization reactor system from insoluble NaSIPA-based compounds, such as the hard, concrete-like particles that can form when using anhydrous NaSIPA. The method can accordingly reduce fouling of a surface of the polymerization reactor system as compared to a method using anhydrous NaSIPA.

In exemplary embodiments, the polymerization reactor system includes a polymerization reactor and a heat exchanger. Polymerization reactor systems for the production of polyester polymers, including polymerization reactors and heat exchangers associated with the same, are also well known in the art and the use and structure thereof is well understood by the skilled artisan. The polymerizing step can be conducted in the polymerization reactor, and the method can further include the step of directing the NaSIPA-enhanced polymer, e.g., NaSIPA-enhanced polyester, from the polymerization reactor to the heat exchanger, wherein fouling of a surface of the heat exchanger is reduced.

As discussed in more detail herein, the skilled artisan will understand how to formulate a masterbatch using techniques and materials known in the art and further will understand specific conditions associated with formulating a masterbatch, including amounts and types of the NaSIPA hydrate and a suitable carrier.

Also as discussed in more detail herein, NaSIPA hydrates can be prepared as described herein using methods known in the art. For example, as discussed herein, a solution containing sulfoisophthalic acid (HSIPA) can be prepared by sulfonating isophthalic acid, for example, by combining isophthalic acid with oleum ("fuming sulfuric acid") or pure $SO_3$; the solution containing HSIPA can be contacted with a sodium cation producing compound, such as but not limited to NaOH, to form a reaction mixture; and the reaction mixture can then be maintained under conditions (e.g., temperature and time) sufficient to form a sodium salt of HSIPA (NaSIPA). The NaSIPA can then be isolated (e.g., filtered) from the reaction mixture and optionally washed, for example with acetic acid.

In these aspects, NaSIPA is also provided in the form of a hydrate, such as represented by the formula NaSIPA·$xH_2O$, wherein x represents the number of water molecules. In exemplary embodiments, the NaSIPA hydrate is NaSIPA monohydrate (x=1).

In exemplary embodiments, the NaSIPA hydrate is a hydrate of the sodium salt of 5-sulfoisophthalic acid of the formula below:

x H₂O

For example, the NaSIPA hydrate can be a monohydrate of the sodium salt of 5-sulfoisophthalic acid, wherein x in the formula above is 1.

Again, as discussed in more detail herein, the skilled artisan will understand conditions such as drying temperatures and duration to use to provide NaSIPA hydrates, such as NaSIPA monohydrate.

The amount of NaSIPA hydrate introduced in the method of making NaSIPA-enhanced polyester polymer can vary, for example depending on the amount of NaSIPA to be incorporated into the polyester polymer. In exemplary embodiments, the method can introduce at least 1 weight percent, for example at least 2 weight percent NaSIPA hydrate, based on the total weight (100 weight percent) of NaSIPA hydrate, dicarboxylic acid component and diol component and/or based on the total weight (100 weight percent) of the resultant polyester polymer. As another example, the method can introduce 1 weight percent to 4.9 weight percent NaSIPA hydrate, as another example 2 weight percent to 4.9 weight percent NaSIPA hydrate, as another example at least 4.9 weight percent NaSIPA hydrate, as another example 4.9 weight percent to 9 weight percent NaSIPA hydrate, and as another example at least 9 weight percent NaSIPA hydrate, based on the total weight (100 weight percent) of NaSIPA hydrate, dicarboxylic acid component and diol component and/or based on the total weight (100 weight percent) of the resultant polyester polymer. As another example, the method can introduce 1 weight percent to 10 weight percent, for example 2 weight percent to 9 weight percent NaSIPA hydrate, based on the total weight (100 weight percent) of NaSIPA hydrate, dicarboxylic acid component and diol component and/or based on the total weight (100 weight percent) of the resultant polyester polymer. In some embodiments, the method can introduce at least 1, 2, 3, 4, 5, 6, 7, 8, 9, 10, or higher, weight percent NaSIPA hydrate, based on the total weight (100 weight percent) of NaSIPA hydrate, dicarboxylic acid component and diol component and/or based on the total weight (100 weight percent) of the resultant polyester polymer. Further, according to some embodiments, NaSIPA hydrate can be present in an amount from any of the foregoing amounts to any other of the foregoing amounts.

In exemplary embodiments, the method can introduce NaSIPA hydrate in an amount sufficient to incorporate at least 1000 ppm sulfur, for example at least 2500 ppm sulfur, derived from the NaSIPA hydrate into the polyester polymer structure. For example, the method can introduce NaSIPA hydrate in an amount sufficient to incorporate 1000 ppm sulfur to 5500 ppm sulfur, for example 2500 ppm sulfur to 5500 ppm sulfur, as another example at least 5500 ppm sulfur, as another example 5500 ppm to 10,000 ppm sulfur, and as another example at least 10,000 ppm sulfur derived from NaSIPA hydrate into polyester polymer. As another example, the method can introduce NaSIPA hydrate in an amount sufficient to incorporate 1000 ppm to 10,000 ppm sulfur, for example 2500 ppm to 10,000 ppm sulfur, derived from the NaSIPA hydrate into the polyester polymer. In some embodiments, the method can introduce NaSIPA hydrate in an amount sufficient to incorporate at least 1000, 1500, 2000, 2500, 3000, 3500, 4000, 4500, 5000, 5500, 6000, 6500, 7000, 7500, 8000, 8500, 9000, 9500, 10,000, or higher, ppm sulfur derived from the NaSIPA hydrate into the polyester polymer. Further, according to some embodiments, the method can introduce sulfur into the polyester polymer in an amount from any of the foregoing amounts to any other of the foregoing amounts.

Polyester may be produced in a batch process in which the product of the ester interchange or esterification reaction is formed in one vessel and then transferred to a second, agitated vessel for polymerization (i.e., melt phase polycondensation). Generally, the polycondensation reaction continues in the second vessel until the power used by the agitator indicates that the polyester melt has achieved the desired intrinsic viscosity and, thus, the desired molecular weight. It is more commercially practicable, however, to carry out the esterification or ester interchange reactions, and then the polymerization reaction as a continuous process. The continuous production of polyester can result in greater throughput, and so is more typical in large-scale manufacturing facilities.

Whether forming polyester polymers, e.g., polyethylene terephthalate polymers, via esterification or transesterification, one or more catalysts are typically employed to promote polymerization. Catalysts are usually introduced before melt phase polycondensation (i.e., during or immediately after esterification or transesterification) or shortly after the onset of melt phase polycondensation. Those having ordinary skill in the art will appreciate that the start of melt polycondensation is characterized by reduced pressure conditions (i.e., reaction at less than atmospheric pressure).

Exemplary catalysts include aluminum catalysts, antimony catalysts, germanium catalysts, and titanium catalysts. Other exemplary catalysts include cobalt catalysts, manganese catalysts, and zinc catalysts. Those having ordinary skill in the art appreciate that catalyst loading depends upon catalytic efficacy and can readily determine the appropriate loading based on the catalyst employed. For example, titanium catalyst or germanium catalyst might be introduced in amounts sufficient for the resulting polyester, e.g., polyethylene terephthalate resin, to include between about 2 and 50 ppm of elemental titanium or elemental germanium, respectively, whereas antimony might be introduced in amounts sufficient for the resulting polyester, e.g., polyethylene terephthalate resin, to include between about 25 and 300 ppm of elemental antimony.

Stabilizing compounds, typically phosphorus in the form of phosphates and phosphites, can also be employed in polyester synthesis. Catalysts can have undesirable effects, and stabilizing compounds can be used to offset undesirable effects of catalysts. A phosphorus stabilizer may be introduced at any time but is typically added after esterification or transesterification (e.g., during and/or after melt phase polycondensation is essentially complete), in an amount sufficient for the resulting polyester polymer, e.g., polyethylene terephthalate resin, to include less than about 150 ppm elemental phosphorus, typically less than about 100 ppm (e.g., between about 20 and 50 ppm).

The esterification reaction yields monomers and oligomers of dicarboxylic acid and diol, as well as water, which is continuously removed as it is formed to enable the esterification reaction to go essentially to completion. The monomers and oligomers are then polymerized via melt phase polycondensation to form polyester polymers, e.g., polyethylene terephthalate polymers. In some embodiments, the polyester polymers, e.g., polyethylene terephthalate polymers, can have an intrinsic viscosity greater than about 0.50 dL/g (e.g., greater than about 0.55 dL/g), for example greater than about 0.60 dL/g (e.g., greater than about 0.65 dL/g), and as another example greater than about 0.70 dL/g (e.g., between about 0.70 dL/g and 0.90 dL/g, or greater than about 0.75 dL/g, such as between about 0.78 and 0.86 dL/g).

Thereafter, the polyester polymers, e.g., polyethylene terephthalate polymers, can be formed into pellets, which are then crystallized and, optionally, polymerized in the solid state. In exemplary embodiments, the polyester polymers, e.g., polyethylene terephthalate polymers, can be polymerized in the solid state to an intrinsic viscosity of for example greater than about 0.70 dL/g (e.g., greater than about 0.75 dL/g) and as another example greater than about 0.80 dL/g (e.g., between about 0.81 and 0.87 dL/g). In some instances, the polyester polymers, e.g., polyethylene terephthalate polymers, can be polymerized in the solid state to an intrinsic viscosity of greater than about 0.85 dL/g (e.g., 0.9-1.1 dL/g). In many instances, the polyester polymers, e.g., polyethylene terephthalate polymers, can be polymerized in the solid state to an intrinsic viscosity of less than 0.86 dL/g (e.g., 0.75-0.78 dL/g).

The following discussion relates to exemplary embodiments wherein the method includes reacting a terephthalic acid component (terephthalic acid and/or a dialkyl ester thereof) and an ethylene glycol component to form polyethylene terephthalate prepolymers, and then polymerizing the prepolymers via melt phase polycondensation to form polyethylene terephthalate polymers. The following is provided to aid in the understanding of the disclosure and should not be interpreted as limiting the scope thereof.

As a non-limiting example, the method can involve a two-step ester exchange reaction. In this example, the aforementioned step of reacting a terephthalic acid component and a diol component includes reacting dimethyl terephthalate and excess ethylene glycol in a heated, catalyzed ester exchange reaction (i.e., transesterification) to form bis(2 hydroxyethyl)terephthalate monomers, as well as methanol as a byproduct. To enable the ester exchange reaction to go essentially to completion, methanol is continuously removed as it is formed. The bis(2 hydroxyethyl)terephthalate monomer product is then catalytically polymerized via polycondensation (i.e., melt phase and/or solid state polymerization) to produce polyethylene terephthalate polymers.

As another non-limiting example, the method can employ a direct esterification reaction. In this example, the aforementioned step of reacting a terephthalic acid component and a diol component includes reacting terephthalic acid and excess ethylene glycol in a heated esterification reaction to form monomers and oligomers of terephthalic acid and ethylene glycol, as well as water as a byproduct. To enable the esterification reaction to go essentially to completion, water is continuously removed as it is formed. The monomers and oligomers are subsequently catalytically polymerized via polycondensation (i.e., melt phase and/or solid state polymerization) to form polyethylene terephthalate polyester. Ethylene glycol is continuously removed during polycondensation to create favorable reaction kinetics.

In view of the foregoing, an exemplary method of making the NaSIPA-enhanced polyethylene terephthalate resin includes reacting, in a heated esterification reaction, a diacid moiety that includes at least 90 mole percent terephthalic acid and a diol moiety that includes at least 90 mole percent ethylene glycol. Diacid and diol modifiers as known in the art may be included such that the resulting polyethylene terephthalate polymer has less than about 12 mole percent substitution (e.g., between about 2 and 6 mole percent comonomer substitution). For example, the diacid moiety might include between about 3 and 6 mole percent isophthalic acid with the remainder terephthalic acid, and the diol moiety might include between about 1 and 4 mole percent diethylene glycol, and the remainder ethylene glycol. Alternatively, the diacid moiety might include between about 1 and 3 mole percent isophthalic acid with the remainder terephthalic acid, and the diol moiety might include between about 1 and 2 mole percent diethylene glycol, between about 1 and 3 mole percent cyclohexane dimethanol, and the remainder ethylene glycol. Those having ordinary skill in the art will recognize that it is within the scope the present invention to substitute a diester moiety (i.e., mostly dimethyl terephthalate) for the diacid moiety (i.e., mostly terephthalic acid).

Those having ordinary skill in the art will appreciate that commercial polyethylene terephthalate polymers can be modified polyethylene terephthalate polyesters (i.e., the reaction of the terephthalic acid moiety and the diol moiety typically yields polyethylene terephthalate prepolymers having at least some comonomer substitution.) In this regard, the modifiers in the terephthalic acid component and the diol component (i.e., the terephthalic acid moiety and the diol moiety) are typically randomly substituted in the resulting polyester.

As used herein, the term "comonomer" is intended to include monomeric and oligomeric modifiers (e.g., polyethylene glycol). The polyethylene terephthalate generally includes less than about 12 mole percent comonomer substitution (e.g., between about 1 and 10 mole percent modifiers). The polyethylene terephthalate more typically includes less than 8 mole percent comonomer substitution and more than 2 mole percent comonomer substitution (e.g., between about 3 and 6 mole percent modifiers).

For polyethylene terephthalate polymers, isophthalic acid, diethylene glycol, and 1,4-cyclohexane dimethanol are the typical modifiers. The terephthalate component may include at least 90 mole percent terephthalic acid or its dialkyl ester, dimethyl terephthalate, and the diol component may include at least 90 mole percent ethylene glycol. More typically, the terephthalate component includes at least 94 mole percent terephthalic acid or its dialkyl ester and the diol component includes at least 94 mole percent ethylene glycol. For polyethylene terephthalate fiber resins, no comonomer substitution is necessary, but where employed, typically includes diethylene glycol or polyethylene glycol.

It will be understood that diacid comonomer should be employed when the terephthalic acid component is mostly terephthalic acid (i.e., a diacid component), and diester comonomer should be employed when the terephthalic acid component is mostly dimethyl terephthalate (i.e., a diester component).

It will be further understood by those having ordinary skill in the art that to achieve the NaSIPA-enhanced polyester polymer, e.g., NaSIPA-enhanced polyethylene terephthalate polymer, a molar excess of the diol component is reacted with the dicarboxylic acid component (i.e., the diol component is present in excess of stoichiometric proportions). In reacting a diacid component and a diol component via a direct esterification reaction, the molar ratio of the diacid component and the diol component is typically between about 1.0:1.0 and 1.0:1.6. Alternatively, in reacting a diester component and a diol component via an ester interchange reaction, the molar ratio of the diester component and the diol component is typically greater than about 1.0:2.0.

The diol component usually forms most terminal ends of the polymer chains and so is present in the resulting polyester in slightly greater fractions. This is what is meant by the phrases "about a 1:1 molar ratio of a dicarboxylic acid component and a diol component" and "about a 1:1 molar ratio of the diester component and the diol component," each of which may be used to describe the polyester polymers of the present invention.

As a non-limiting example, a polyethylene terephthalate polymer is typically composed of about a 1:1 molar ratio of a diacid component and a diol component. The diacid component typically includes at least 90 mole percent terephthalic acid (e.g., terephthalic acid and isophthalic acid) and the diol component includes at least 90 mole percent ethylene glycol (e.g., ethylene glycol and diethylene glycol). More typically, the diacid component includes at least 95 mole percent terephthalic acid (e.g., terephthalic acid and isophthalic acid) and the diol component includes at least 95 mole percent ethylene glycol (e.g., ethylene glycol, diethylene glycol, and 1,4-cyclohexane dimethanol). Analogous ranges apply to polyethylene terephthalate resins composed of diester (i.e., mostly dimethyl terephthalate) and diol components.

In an exemplary embodiment, the polyethylene terephthalate includes about a 1:1 molar ratio of (i) a diacid component of mostly terephthalic acid and (ii) a diol component of between about 1 and 2 mole percent diethylene glycol, between about 1 and 3 mole percent 1,4-cyclohexane dimethanol, and the remainder ethylene glycol. In an alternative exemplary embodiment, the polyethylene terephthalate includes about a 1:1 molar ratio of (i) a diester component of mostly dimethyl terephthalate and (ii) a diol component of between about 1 and 2 mole percent diethylene glycol, between about 1 and 3 mole percent 1,4 cyclohexane dimethanol, and the remainder ethylene glycol.

An exemplary NaSIPA-enhanced polyethylene terephthalate polymer according to the present invention generally possesses an intrinsic viscosity of more than about 0.50 dL/g, typically more than about 0.60 dL/g, and more typically more than about 0.68 dL/g.

For polyester fibers according to the present disclosure, the polyester polymer, e.g., polyethylene terephthalate polymer, typically has an intrinsic viscosity of between about 0.50 dL/g and 0.70 dL/g, for example an intrinsic viscosity between about 0.60 dL/g and 0.65 dL/g (e.g., 0.62 dL/g). The polyester (e.g., polyethylene terephthalate) fiber polymers are typically polymerized only in the melt phase (i.e., the fiber resins usually do not undergo solid state polymerization). More generally, to the extent polymers according to the present disclosure are polymerized only in the melt phase (i.e., no solid state polymerization), such resins may possess an intrinsic viscosity floor of about 0.50 dL/g.

The terms "melt viscosity" and "intrinsic viscosity" are used herein in their conventional sense. As used herein, the term "melt viscosity" represents the resistance of molten polymer to shear deformation or flow as measured at specified conditions. Melt viscosity is primarily a factor of intrinsic viscosity, shear, and temperature. As used herein, the term "melt viscosity" refers to "zero-shear melt viscosity" unless indicated otherwise.

Melt viscosity can be measured and determined without undue experimentation by those of ordinary skill in this art. For example, the zero-shear melt viscosity at a particular temperature can be calculated by employing ASTM Test Method D-3835-93A using a Kayeness Galaxy 5 capillary melt rheometer with a 0.30-inch (diameter) by 1-inch (length) to determine melt viscosities at several shear rates between about 35 sec-1 and 4000 sec-1, and thereafter extrapolating these melt viscosities to zero using the Modified Cross Method. In calculating zero shear viscosity, it is recommended that several low shear rates, (e.g., less than 100 sec-1), be included to ensure that the extrapolation to zero is accurate.

As used herein, the term "intrinsic viscosity" is the ratio of the specific viscosity of a polymer solution of known concentration to the concentration of solute, extrapolated to zero concentration. Intrinsic viscosity, which is widely recognized as standard measurements of polymer characteristics, is directly proportional to average polymer molecular weight. See, e.g., Dictionary of Fiber and Textile Technology, Hoechst Celanese Corporation (1990); Tortora & Merkel, Fairchild's Dictionary of Textiles (7th Edition 1996).

Intrinsic viscosity can be measured and determined without undue experimentation by those of ordinary skill in this art. For the intrinsic viscosity values described herein, the intrinsic viscosity is determined by dissolving the polyester polymer in an orthochlorophenol mixture, measuring the relative viscosity of the solution using a Schott Autoviscometer (AVS Schott and AVS 500 Viscosystem), and then calculating the intrinsic viscosity based on the relative viscosity. See, e.g., Dictionary of Fiber and Textile Technology ("intrinsic viscosity").

For example, for polyester polymer, a 0.6-gram sample (+/−0.005 g) of dried polymer sample can be dissolved in about 50 ml (61.0-63.5 grams) of an orthochlorophenol mixture at a temperature of about 105° C. Fibrous samples are typically cut into small pieces, whereas chip samples are ground. After cooling to room temperature, the solution is placed in the viscometer at a controlled, constant temperature, (e.g., between about 20° and 25° C.), and the relative viscosity is measured. As noted, intrinsic viscosity is calculated from relative viscosity.

Methods for making polyester polymer are well known in the art and the specific parameters and conditions thereof (for example, temperature, pressure, duration, etc.) will be understood by the skilled artisan.

In an exemplary method, a continuous feed of terephthalic acid and excess ethylene glycol enters a direct esterification vessel. The esterification vessel can be operated at a temperature of between about 240° C. and 290° C. (e.g., 260° C.) and at a pressure of between about 5 and 85 psia (e.g., atmospheric pressure) for between about one and five hours. The esterification reaction forms low molecular weight monomers, oligomers, and water. The water is removed as the reaction proceeds to provide favorable reaction equilibrium.

Thereafter, the low molecular weight monomers and oligomers are polymerized via melt polycondensation to form polyethylene terephthalate polyester. This polycondensation stage generally employs a series of two or more vessels and is operated at a temperature of between about 250° C. and 305° C. for between about one and four hours.

The polycondensation reaction usually begins in a first vessel called the low polymerizer. The low polymerizer is operated at a pressure range of between about 0 and 70 torr (e.g., 10-60 mm Hg). The monomers and oligomers polycondense to form polyethylene terephthalate prepolymers and polymers (i.e., the polymer melt), as well as ethylene glycol.

To promote favorable reaction kinetics, ethylene glycol is removed from the polymer melt using an applied vacuum to drive the reaction to completion. In this regard, the polymer melt is typically agitated to promote the escape of the ethylene glycol from the polymer melt and to assist the highly viscous polymer melt in moving through the polymerization vessel.

As the polymer melt is fed into successive vessels, the molecular weight and thus the intrinsic viscosity of the polymer melt increases. The temperature of each vessel is generally increased and the pressure decreased to allow greater polymerization in each successive vessel.

The final vessel, generally called the "high polymerizer," is operated at a pressure of between about 0 and 40 torr. Like the low polymerizer, each of the polymerization vessels is connected to a vacuum system having a condenser, and each is typically agitated to facilitate the removal of ethylene glycol and degradation byproducts. The residence time in the polymerization vessels and the feed rate of the ethylene glycol and terephthalic acid into the continuous process is determined, in part, based on the target molecular weight of the polyethylene terephthalate polyester. Because the molecular weight can be readily determined based on the intrinsic viscosity of the polymer melt, the intrinsic viscosity of the polymer melt is generally used to determine polymerization conditions, such as temperature, pressure, the feed rate of the reactants, and the residence time within the polymerization vessels.

NaSIPA hydrate can be introduced in the foregoing exemplary method as described herein. For example, NaSIPA hydrate can be injected into the esterification vessel, the low polymerizer and/or the high polymerizer, directly and/or via a carrier (e.g., via diacid component and/or diol component and/or polyester precursors and/or other suitable carrier) using extruder-based and/or masterbatch unit operations. NaSIPA hydrate can also be injected before and/or during esterification and/or before and/or during polycondensation in the low polymerizer and/or the high polymerizer.

In addition to the formation of polyethylene terephthalate polymers, side reactions occur that produce undesirable by-products. For example, the esterification of ethylene glycol forms diethylene glycol, which is incorporated into the polymer chain. As is known to those of skill in the art, diethylene glycol lowers the softening point of the polymer. Moreover, cyclic oligomers (e.g., trimer and tetramers of terephthalic acid and ethylene glycol) may occur in minor amounts. The continued removal of ethylene glycol as it forms in the polycondensation reaction will generally reduce the formation of these by-products. With respect to unwanted byproducts, acetaldehyde is kept below 5 ppm.

After the polymer melt exits the polycondensation stage, typically from the high polymerizer, it is generally filtered and extruded. After extrusion, the polyethylene terephthalate is quenched, typically by spraying with water, to solidify it. The solidified polyethylene terephthalate polyester is cut into chips or pellets for storage and handling purposes. The polyester pellets typically have an average mass of about 15-20 mg. As used herein, the term "pellets" is used generally to refer to chips, pellets, and the like.

As will be known to those of skill in the art, the pellets formed from the polyethylene terephthalate polymers may be subjected to crystallization and, if necessary, solid state polymerization to increase the molecular weight of the polyethylene terephthalate resin.

Although the prior discussion assumes a continuous production process, it will be understood that the invention is not so limited. The teachings disclosed herein may be applied to semi-continuous processes and batch processes.

In another aspect, the present disclosure relates to NaSIPA-enhanced polyesters that have NaSIPA incorporated into the polymer structure (e.g., into the polymer backbone, as pendant groups and/or as terminal groups) produced using the methods described herein using NaSIPA hydrate (e.g., have NaSIPA derived from NaSIPA hydrate incorporated into the polymer structure). In exemplary embodiments, the NaSIPA-enhanced polyester can include at least 1 weight percent, for example at least 2 weight percent, NaSIPA derived from NaSIPA hydrate incorporated into the polymer. For example, the NaSIPA-enhanced polyester can include 1 weight percent to 4.9 weight percent NaSIPA, for example 2 weight percent to 4.9 weight percent NaSIPA, as another example at least 4.9 weight percent NaSIPA, as another example 4.9 weight percent to 8.9 weight percent NaSIPA, and as another example at least 8.9 weight percent NaSIPA derived from NaSIPA hydrate incorporated into polyester polymer. As another example, the NaSIPA-enhanced polyester can include 1 weight percent to 10 weight percent, for example 2 weight percent to 9 weight percent NaSIPA derived from NaSIPA hydrate incorporated into the polyester polymer. In some embodiments, the NaSIPA-enhanced polyester can include at least 1, 2, 3, 4, 5, 6, 7, 8, 9, 10, or higher, weight percent NaSIPA derived from NaSIPA hydrate incorporated into the polyester polymer. Further, according to some embodiments, the NaSIPA-enhanced polyester can include NaSIPA derived from NaSIPA hydrate incorporated into the polyester polymer in an amount from any of the foregoing amounts to any other of the foregoing amounts.

In exemplary embodiments, the NaSIPA-enhanced polyesters can include at least 1000 ppm, for example at least 2500 ppm, sulfur derived from NaSIPA hydrate incorporated into the polyester polymer structure. For example, the NaSIPA-enhanced polyester can include 1000 ppm to 5500 ppm sulfur, for example 2500 ppm sulfur to 5500 ppm sulfur, as another example at least 5500 ppm sulfur, as another example 5500 ppm to 10,000 ppm sulfur, and as another example at least 10,000 ppm sulfur derived from NaSIPA hydrate incorporated into polyester polymer. As another example, the NaSIPA-enhanced polyester can include 1000 ppm to 10,000 ppm, for example 2500 ppm to 10,000 ppm, sulfur derived from NaSIPA hydrate incorporated into the polyester polymer. In some embodiments, the NaSIPA-enhanced polyester can include at least 1000, 1500, 2000, 2500, 3000, 3500, 4000, 4500, 5000, 5500, 6000, 6500, 7000, 7500, 8000, 8500, 9000, 9500, 10,000, or higher, ppm sulfur derived from NaSIPA hydrate incorporated into the polyester polymer. Further, according to some embodiments, the NaSIPA-enhanced polyester can include NaSIPA derived from NaSIPA hydrate incorporated into the polyester polymer in an amount from any of the foregoing amounts to any other of the foregoing amounts.

In another aspect, the present disclosure relates to products produced from the NaSIPA-enhanced polyesters, including fibrous materials. As discussed in more detail herein, the term "fibrous materials" can include without limitation fibers, yarns, nonwoven fabrics, woven fabrics, and/or knit fabrics. Also as discussed in more detail herein, the term "fiber" can refer to fibers of finite length, such as conventional staple fiber, and also to substantially continuous filaments; and the term "fiber" also includes spunbonded filaments, meltblown fibers, fibers produced by electrospinning, nanofibers, nanofilaments, and the like, as known the art. The NaSIPA-enhanced polyester fibers can be spun, knitted, woven, pressed, tufted or otherwise formed to provide textile products or articles such as but not limited to yarns (including carpet yarns), threads, fabrics (knit, woven, nonwoven), carpets, rugs, and the like.

Other variations of the disclosed embodiments can be understood and effected by those of ordinary skill in the art in practicing the present invention by studying the disclosure and the appended claims. In the claims, the word "comprising" does not exclude other elements or steps, and the indefinite article "a" or "an" does not exclude a plurality. Unless otherwise specified, numerical ranges are intended to include the endpoints.

It is within the scope of this disclosure for one or more of the terms "substantially," "about," "approximately," and/or the like, to qualify each adjective and adverb of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "sufficient," "substantially," "about," "approximately," and the like.

The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

While various aspects, features, and embodiments have been disclosed herein, other aspects, features, and embodiments will be apparent to those having ordinary skill in the art. The various disclosed aspects, features, and embodiments are for purposes of illustration and are not intended to be limiting. It is intended that the scope of the present invention includes at least the following claims and their equivalents.

That which is claimed is:

1. A method for making of NaSIPA hydrate-enhanced polyamide polymer, comprising:
   introducing polyamide forming reactant and NaSIPA monohydrate into a polymerization reactor; and
   polymerizing the polyamide forming reactant in the presence of the NaSIPA monohydrate to provide a polyamide polymer including NaSIPA incorporated into the structure of the polyamide polymer.

2. The method according to claim 1, wherein the step of polymerizing the polyamide forming reactant comprises polymerizing a dicarboxylic acid component and a diamine component.

3. The method according to claim 1, wherein the step of polymerizing the polyamide forming reactant comprises polymerizing a dicarboxylic acid component-diamine component salt.

4. The method according to claim 1, wherein the polyamide forming reactant comprises adipic acid and 1,6-hexanediamine and/or a salt of adipic acid and 1,6-hexanediamine.

5. The method according to claim 1, wherein the introducing step comprises introducing the NaSIPA monohydrate and the polyamide forming reactant into the polymerization reactor before the step of polymerizing the polyamide forming reactant.

6. The method according to claim 1, wherein the introducing step comprises introducing NaSIPA monohydrate into the polymerization reactor during the step of polymerizing the polyamide forming reactant.

7. The method according to claim 1, wherein the polymerizing step comprises polymerizing the polyamide forming reactant in the presence of from 1 weight percent to 10 weight percent NaSIPA monohydrate.

8. The method according to claim 1, wherein the polyamide polymer includes from 1000 to 10,000 ppm sulfur.

9. The method according to claim 1, comprising forming the polyamide polymer into fibers.

10. The method according to claim 9, comprising forming the fibers into carpet yarn.

11. The method according to claim 1, comprising polymerizing the polyamide forming reactant in a polymerization reactor system in the presence of NaSIPA monohydrate to provide a polyamide polymer including NaSIPA incorporated into the structure of the polyamide polymer, wherein the use of NaSIPA monohydrate reduces fouling of a surface of the polymerization reactor system from insoluble NaSIPA-based compounds.

12. The method according to claim 1, wherein the polymerizing step comprises polymerizing the polyamide forming reactant in the presence of 4.9 weight percent to 9 weight percent NaSIPA monohydrate.

13. The method according to claim 1, wherein the polyamide polymer includes from 2500 ppm to 10,000 ppm sulfur.

14. The method according to claim 13, wherein the polyamide polymer includes from 5500 ppm to 10,000 ppm sulfur.

* * * * *